No. 892,105. PATENTED JUNE 30, 1908.
C. P. WHITE.
COMBINED PIPE SUPPORT AND CLAMP.
APPLICATION FILED DEC. 18, 1907.
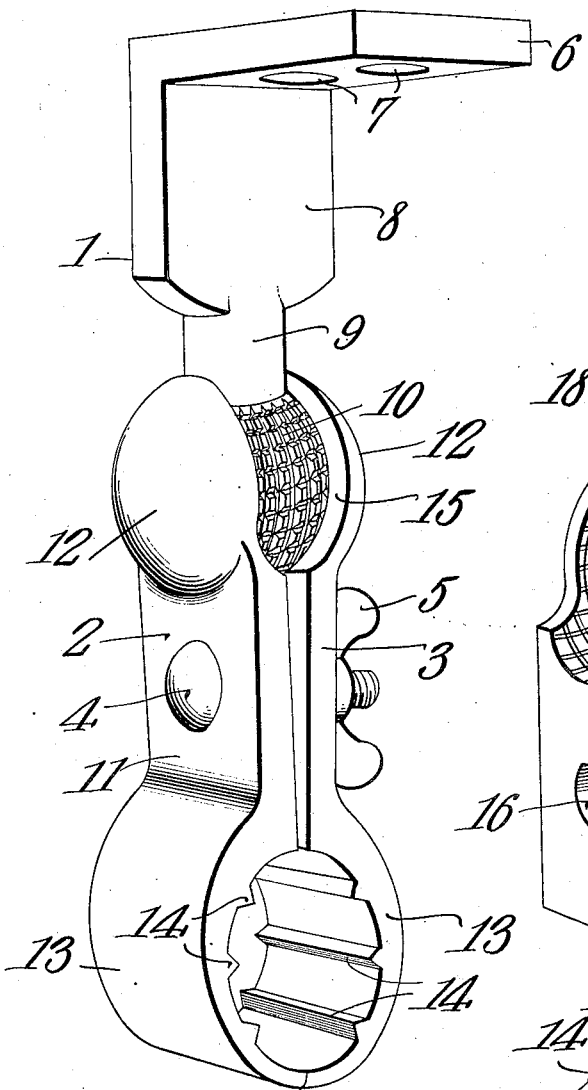
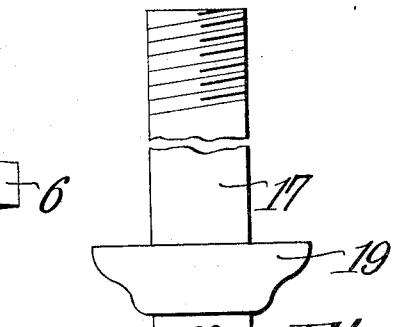
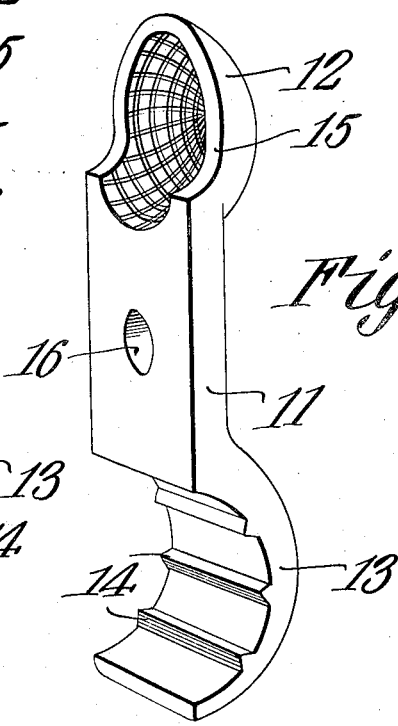
Inventor,
Charles P. White.
Witnesses:
By C. A. Snow & Co.
Attorneys.

UNITED STATES PATENT OFFICE.

CHARLES PARKER WHITE, OF GREENSBORO, NORTH CAROLINA, ASSIGNOR OF ONE-FOURTH TO EDWIN A. RIVES AND ONE-FOURTH TO ARTHUR G. WILSON, OF GREENSBORO, NORTH CAROLINA.

COMBINED PIPE SUPPORT AND CLAMP.

No. 892,105.  Specification of Letters Patent.  Patented June 30, 1908.

Application filed December 18, 1907. Serial No. 407,096.

*To all whom it may concern:*

Be it known that I, CHARLES PARKER WHITE, a citizen of the United States, residing at Greensboro, in the county of Guilford and State of North Carolina, have invented a new and useful Combined Pipe Support and Clamp, of which the following is a specification.

This invention relates to combined pipe supports and clamps.

The object of the invention is to provide an article of this character which shall be adapted for supporting any kind of pipe upon any suitable support, such as a beam or ceiling, a wall, or a floor, and in which the clamp may be readily adjusted to permit the pipe to assume any angular or other position necessary in properly sustaining it.

With the above and other objects in view, as will appear as the nature of the invention is better understood, the same consists in the novel construction and combination of parts of a combined pipe support and clamp, as will be hereinafter fully described and claimed.

In the accompanying drawings, forming a part of this specification, and in which like characters of reference indicate corresponding parts, Figure 1 is a view in perspective of a form of combined pipe support and clamp adapted for sustaining a pipe from an overhead, underfoot, or lateral support. Fig. 2 is a view in side elevation of a supporting member or a suspending member, according to the manner in which it is positioned, that may be employed in lieu of that shown in Fig. 1. Fig. 3 is a perspective detail view of one of the clamping jaws.

Referring to the drawings and to Figs. 1 and 2 thereof, 1 designates generally the hanger or support, 2 and 3 the pipe clamping members, 4 an assembling bolt, and 5 a winged nut combined with the bolt for holding the clamping members firmly positioned on or assembled with a pipe and with the hanger.

The hanger comprises an approximately L-shaped member of which one branch 6 is provided with orifices 7 to receive bolts or screws to secure the hanger to any suitable support. The other branch 8 of the member is formed with a cylindrical shank 9 that carries a ball 10 provided with latitudinal and longitudinal scorings to cause the surface of the ball to present a roughened exterior.

Each of the clamping members 2 and 3 is a counterpart of the other, so that the description of one will serve for both. The clamping member comprises a shank 11 that is flat, and is provided at one end with an approximately hemi-spherical socket 12, and at its other end with a semi-circular jaw 13, the inner wall of which is provided with a plurality of transverse teeth or ribs 14 that are adapted to bite into the pipe and thus secure a firm hold thereon.

The inner wall of the socket is also provided with latitudinal and longitudinal scorings to present a roughened surface which will coact with the scorings of the ball to hold the clamping member at any desired angle of adjustment relatively thereto. The inner edge of the socket is cut away at 15 to provide space to allow the clamping members to be swung at acute angles to the branch 8 of the hanger, and thereby secure an extended range of adjustment in addition to that resulting from the torsional adjustment of the clamping members on the ball. The shank 11 of each clamping member is provided with orifices 16 to receive the shank of the bolt 4.

Instead of employing the approximately L-shaped hanger shown in Fig. 1, that shown in Fig. 2 may be employed, which consists of a bolt 17 of any preferred length and threaded at one end, preferably with wood screw threads in order to adapt it to be screwed into a beam, flooring or wall. The other end of the bolt is provided with a head 18, similar to the head 10, and adjacent thereto is a collar 19 that will serve to limit the insertion of the bolt in the support, and which is spaced from the head by a cylindrical shank 20.

The invention herein shown is peculiarly adapted for supporting steam pipes from the sill beams of railway cars, and also along the walls of factories, or in other positions where a hasty, but strong, piece of work is to be done.

All the parts, with the exception of the bolt and nut, will be of malleable cast iron, and therefore strong and durable, and not liable to breakage even when roughly handled in being positioned.

I claim:—

1. A combined pipe support and clamp comprising a supporting member having a cylindrical shank carrying a head provided with longitudinal and latitudinal scores, and a pair of clamping members each having at one end a socket provided with longitudinal and latitudinal scores, the opposed edges of the two sockets being cut away to permit them to straddle the shank and also to be adjusted at an acute angle thereto, and pipe clamping jaws carried by the other ends of the clamping members.

2. A combined pipe support and clamp comprising a supporting member having a cylindrical shank carrying a head provided with longitudinal and latitudinal scores, and a pair of clamping members each having at one end a socket provided with longitudinal and latitudinal scores, the opposed edges of the two sockets being cut away to permit them to straddle the shank and also to be adjustable at an acute angle thereto, and pipe clamping jaws carried by the other ends of the clamping members and provided with a plurality of longitudinally disposed V-shaped ribs to prevent turning of the pipe therein.

3. A combined pipe support and clamp comprising a supporting member having a cylindrical shank carrying a head provided with longitudinal and latitudinal scores, and a pair of clamping members each having at one end a socket provided with longitudinal and latitudinal scores, the opposed edges of the two sockets being cut away to permit them to straddle and embrace the shank and also to be adjusted at an acute angle thereto in one plane relative to said clamping members, and pipe clamping jaws carried by the other ends of the clamping members.

In testimony that I claim the foregoing as my own, I have hereto affixed my signature in the presence of two witnesses.

CHARLES PARKER WHITE.

Witnesses:
HENRY WATSON PETERSON,
L. L. FLEMING.